US012727673B2

(12) United States Patent
Guo

(10) Patent No.: US 12,727,673 B2
(45) Date of Patent: Sep. 8, 2026

(54) BASE FRAME ASSEMBLY AND CHAIR HAVING THE SAME

(71) Applicant: ZHONGSHAN MEISIHE FURNITURE CO., LTD., Zhongshan (CN)

(72) Inventor: Liyi Guo, Guangzhou (CN)

(73) Assignee: ZHONGSHAN MEISIHE FURNITURE CO., LTD., Zhongshan (CN)

(*) Notice: Subject to any disclaimer, the term of this patent is extended or adjusted under 35 U.S.C. 154(b) by 262 days.

(21) Appl. No.: 18/625,559

(22) Filed: Apr. 3, 2024

(65) Prior Publication Data

US 2025/0235001 A1 Jul. 24, 2025

(30) Foreign Application Priority Data

Jan. 22, 2024 (CN) ......................... 202410095476.1

(51) Int. Cl.
*A47C 3/30* (2006.01)
*G05G 7/04* (2006.01)

(52) U.S. Cl.
CPC *A47C 3/30* (2013.01); *G05G 7/04* (2013.01)

(58) Field of Classification Search
CPC ........................................................ A47C 3/30
See application file for complete search history.

(56) References Cited

U.S. PATENT DOCUMENTS 6,394,549 B1 * 5/2002 DeKraker .......... A47C 1/03233 297/317
2008/0309135 A1 * 12/2008 Machael ............ A47C 1/03266 297/301.4
2013/0069408 A1 * 3/2013 Chen .................. A47C 1/03205 297/337
2022/0022651 A1 * 1/2022 Guo ................... A47C 1/03272

FOREIGN PATENT DOCUMENTS

EP 3701839 A1 * 9/2020 ............... A47C 3/18

* cited by examiner

*Primary Examiner* — David R Dunn
*Assistant Examiner* — Tania Abraham
(74) *Attorney, Agent, or Firm* — Falcon Rappaport & Berkman LLP

(57) ABSTRACT

A base frame assembly and a chair are disclosed. The base frame assembly includes a frame body, a lifting connecting structure, a translation connecting structure, a backrest connecting structure and a control handle. The lifting connecting structure is used for driving the frame body to lift up or down. The translation connecting structure is used for driving the frame body to move back and forth and/or move left and right. The backrest connecting structure is used for driving a backrest to rotate relative to the frame body. The control handle is movable and/or rotatable in at least three different directions, to respectively drive the lifting connecting structure, the translation connecting structure and the backrest connecting structure through different motion trajectories.

8 Claims, 8 Drawing Sheets

BASE FRAME ASSEMBLY AND CHAIR HAVING THE SAME

CROSS-REFERENCE TO RELATED APPLICATION

This application is based on and claims the benefit of priority from Chinese Patent Application No. 2024100954761, filed on 22 Jan. 2024, the entirety of which is incorporated by reference herein.

TECHNICAL FIELD

The disclosure relates to the field of chairs, and in particular to a base frame assembly and a chair having the same.

BACKGROUND

As we all know, existing chairs such as office chairs typically come with adjustable features, such as a rotatable backrest, and a cushion adjustable in position and height. However, in order to achieve these adjustments, an occupant needs to operate corresponding parts of the chair, which undoubtedly results in inconvenient use.

SUMMARY

The disclosure aims at solving at least one of the technical problems in the existing technology. Therefore, the disclosure proposes a base frame assembly, which can conveniently adjust a state of a chair.

The disclosure further proposes a chair having the base frame assembly.

The base frame assembly according to an embodiment in a first aspect of the disclosure comprises a frame body, a lifting connecting structure, a translation connecting structure, a backrest connecting structure and a control handle; the lifting connecting structure is arranged on the frame body, the lifting connecting structure is used for driving the frame body to lift up or down; the translation connecting structure is arranged on the frame body, the translation connecting structure is used for driving the frame body to move back and forth and/or move left and right; the backrest connecting structure is arranged on the frame body and is used for connecting with a backrest, the backrest connecting structure is used for driving the backrest to rotate relative to the frame body; the control handle is movably arranged on the frame body, the lifting connecting structure, the translation connecting structure and the backrest connecting structure are all connected with the control handle; and the control handle is movable and/or rotatable in at least three different directions, to respectively drive the lifting connecting structure, the translation connecting structure and the backrest connecting structure through different motion trajectories.

The base frame assembly according to the embodiment of the disclosure has at least the following beneficial effects. The frame body is liftable relative to a ground and other parts by the lifting connecting structure, movable relative to a cushion by the translation connecting structure, and able to drive a backrest to rotate by the backrest connecting structure, so that each state of the chair can be smoothly adjusted to a target state for an occupant.

When adjusting each state of the chair, the occupant only needs to drive the control handle to move or rotate in a corresponding direction, so as to achieve adjustment to the corresponding state. As the adjustment to various states can be achieved by the control handle, the time and effort required by the occupant to find and drive the adjustment parts respectively when adjusting a plurality of chair states can be effectively reduced, thus effectively achieving convenient and quick use.

According to some embodiments of the disclosure, the lifting connecting structure comprises a pneumatic rod connecting part arranged on the frame body, the pneumatic rod connecting part is connected with a pneumatic rod component to drive the frame body to lift up or down; the pneumatic rod connecting part is connected with a pull rope, one end of the pull rope is connected with a pneumatic rod to control operation thereof, and the other end of the pull rope is connected with the control handle.

According to some embodiments of the disclosure, the frame body comprises a hidden rack, the control handle is movably connected to the hidden rack; the pull rope extends from the pneumatic rod connecting part into the hidden rack and is connected with the control handle, and the hidden rack is used for shielding the pull rope to prevent the pull rope from being exposed.

According to some embodiments of the disclosure, the frame body is provided with a mounting seat, a rotating seat is rotatably connected to the mounting seat, the control handle is hinged to an end of the rotating seat, a rotating shaft of the rotating seat and a rotating shaft of the control handle relative to the rotating seat are noncoplanar; the pull rope passes through the mounting seat and the rotating seat and is connected with the control handle; and the translation connecting structure is connected with the rotating seat.

According to some embodiments of the disclosure, the translation connecting structure comprises a rotating seat connected with the control handle, the control handle is able to drive the rotating seat to rotate; the translation connecting structure comprises a cushion connecting part and a sliding block, the sliding block is connected with the cushion connecting part; and a side part of the rotating seat is connected with the sliding block and is able to drive the sliding block to slide relative to the frame body.

According to some embodiments of the disclosure, a clamping block is liftably arranged on the frame body, a clamping groove is arranged in the cushion connecting part, the clamping block is able to extend into the clamping groove; a wedge-shaped inclined plane is arranged between the sliding block and the clamping block, and when the sliding block slides, the clamping block is driven to lift up or down through the wedge-shaped inclined plane.

According to some embodiments of the disclosure, the backrest connecting structure comprises a connecting shaft, the connecting shaft is used for connecting the backrest and driving the backrest to rotate relative to the frame body; an end of the connecting shaft is connected with a toothed part, an engaging block is slidably arranged in the frame body, the engaging block is able to be engaged with the toothed part to prevent the toothed part from rotating, and the engaging block is connected with a pull rope and is connected with the control handle through the pull rope.

According to some embodiments of the disclosure, a driving torsion spring is arranged in the frame body, the driving torsion spring is used for connecting to the backrest and driving the backrest to rotate relative to the frame body; a handle and an elastic force adjusting structure are arranged in the frame body, and the handle is rotatable to adjust an elastic force applied to the backrest by the driving torsion spring through the elastic force adjusting structure.

According to some embodiments of the disclosure, a screw is provided around which the handle is rotatable, the screw is connected with a supporting base, an end of the driving torsion spring is engaged with the supporting base and is driven to move by the supporting base; the frame body is provided with a gear, one end of the handle is connected with the gear, the other end of the handle is provided with a rotary knob, a pull rope and a connecting member, the connecting member is provided with clamping teeth, the rotary knob is connected with the connecting member through the pull rope, and the connecting member is rotatable relative to the gear, so that the clamping teeth are engaged with the gear.

A chair according to an embodiment in second aspect of the disclosure comprises the base frame assembly according to the embodiment in the first aspect of the disclosure.

The chair according to the embodiment of the disclosure has at least the following beneficial effects. The frame body is liftable relative to a ground and other parts by the lifting connecting structure, movable relative to a cushion by the translation connecting structure, and able to drive a backrest to rotate by the backrest connecting structure, so that each state of the chair can be smoothly adjusted to a target state for an occupant.

When adjusting each state of the chair, the occupant only needs to drive the control handle to move or rotate in a corresponding direction, so as to achieve adjustment to the corresponding state. As the adjustment to various states can be achieved by the control handle, the time and effort required by the occupant to find and drive the adjustment parts respectively when adjusting a plurality of chair states can be effectively reduced, thus effectively achieving convenient and quick use.

The additional aspects and advantages of the disclosure will be partially given in the following description, and will be partially apparent from the following description, or will be understood via the practice of the disclosure.

BRIEF DESCRIPTION OF THE DRAWINGS

The above and/or additional aspects and advantages of the disclosure will be more apparent from the following description of the embodiments in conjunction with the accompanying drawings, wherein.

REFERENCE NUMERAL

Figure 1:
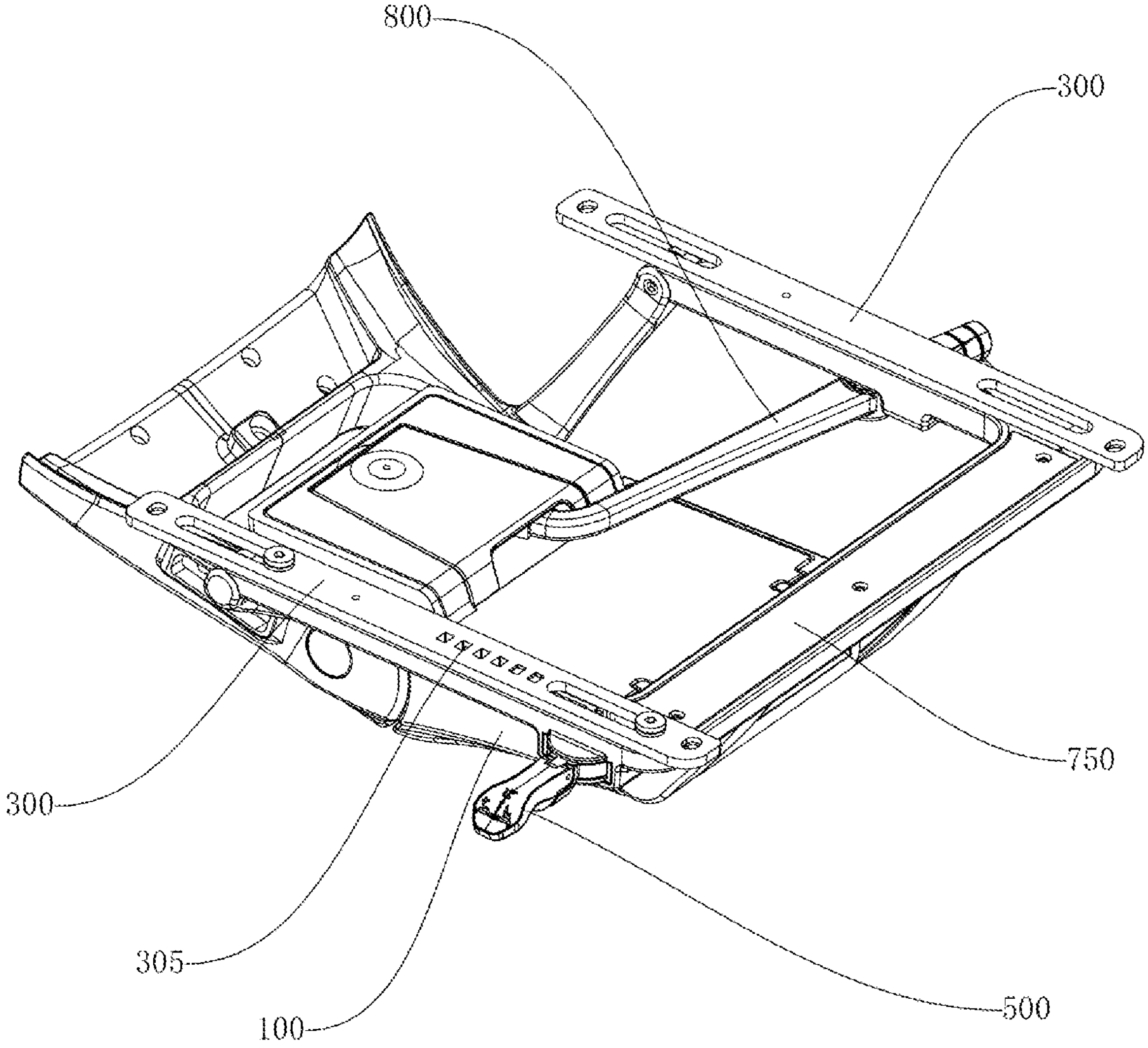
FIG. 1 is a schematic diagram of a base frame assembly according to embodiments of the disclosure.

100 refers to frame body; 200 refers to lifting connecting structure;

300 refers to cushion connecting part; 305 refers to clamping groove;

400 refers to backrest connecting structure; 410 refers to toothed part; 420 refers to engaging block; 430 refers to driving torsion spring; 440 refers to connecting shaft; 460 refers to locking member; 470 refers to locking latch;

500 refers to control handle; 510 refers to mounting seat; 515 refers to through hole, 520 refers to rotating seat; 530 refers to translation connecting structure; 531 refers to connection torsion spring; 532 refers to reset spring; 533 refers to clamping block; 536 refers to wedge-shaped inclined plane; 537 refers to sliding block; 540 refers to pushing spring;

600 refers to control knob;

710 refers to connecting port; 750 refers to hidden rack;

800 refers to handle; 830 refers to elastic force adjusting structure; 831 refers to connecting member; 832 refers to clamping teeth; 835 refers to gear; 836 refers to screw; 837 refers to supporting base; and 850 refers to rotary knob.

DETAILED DESCRIPTION

The embodiments of the disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the disclosure, but should not be construed as limiting the disclosure.

In the description of the disclosure, it should be understood that the orientation or position relation related to the orientation description, such as the orientation or position relation indicated by the terms such as upper, lower, front, rear, left, right, etc., is based on the orientation or position relation shown in the drawings, which is only used for convenience of description of the disclosure and simplification of description instead of indicating or implying that the indicated device or element must have a specific orientation, and be constructed and operated in a specific orientation, and thus shall not be understood as a limitation to the disclosure.

In the description of the disclosure, several means one or more, multiple means two or more, greater than, less than and exceeding are understood as excluding the following number, and above, below and within are understood as including the following number. If first and second are described, the descriptions are used for the purpose of distinguishing the technical features only, and cannot be understood as indicating or implying relative importance, or implicitly indicating the number of technical features indicated thereby, or implicitly indicating the order of technical features indicated thereby.

In the description of the disclosure, unless otherwise clearly defined, words such as setting, installation, connection, and the like, shall be understood broadly, and those of ordinary skills in the art can reasonably determine the specific meanings of the above words in the disclosure in combination with the specific contents of the technical solution.

Referring to FIG. 1, a base frame assembly comprises a frame body 100, a lifting connecting structure 200, a translation connecting structure 530, a backrest connecting structure 400 and a control handle 500. The lifting connecting structure 200 is arranged on the frame body 100, the lifting connecting structure 200 is used for driving the frame body 100 to lift up or down; the translation connecting structure 530 is arranged on the frame body 100, the translation connecting structure 530 is used for driving the frame body 100 to move back and forth and/or move left and right. The backrest connecting structure 400 is arranged on the frame body 100 and is used for connecting with a backrest, the backrest connecting structure 400 is used for driving the backrest to rotate relative to the frame body 100. The control handle 500 is movably arranged on the frame body 100. The lifting connecting structure 200, the translation connecting structure 530 and the backrest connecting structure 400 are all connected with the control handle 500. The control handle 500 is movable and/or rotatable in at least three different directions, to respectively drive the lifting connecting structure 200, the translation connecting structure 530 and the backrest connecting structure 400 through different motion trajectories. The frame body 100 is liftable relative to a ground and other parts by the lifting connecting structure 200, movable relative to a cushion by the translation connecting structure 530, and able to drive the backrest to rotate by the backrest connecting structure 400, so that each state of the chair can be smoothly adjusted to a target state for an occupant. When adjusting each state of the chair, the occupant only needs to drive the control handle 500 to move or rotate in a corresponding direction, so as to achieve adjustment to the corresponding state. As the adjustment to various states can be achieved by the control handle 500, the time and effort required by the occupant to find and drive the adjustment parts respectively when adjusting a plurality of chair states can be effectively reduced, thus effectively achieving convenient and quick use.

To be specific, the frame body 100 is provided with a rotating seat 520, the rotating seat 520 can rotate by taking a vertical direction as an axial direction of a rotating shaft, and the control handle 500 is hinged to the rotating seat 520 and can rotate by taking a horizontal direction as the axial direction of the rotating shaft, so that the multi-directional rotation for the rotating seat 520 can be successfully achieved.

Figure 4:
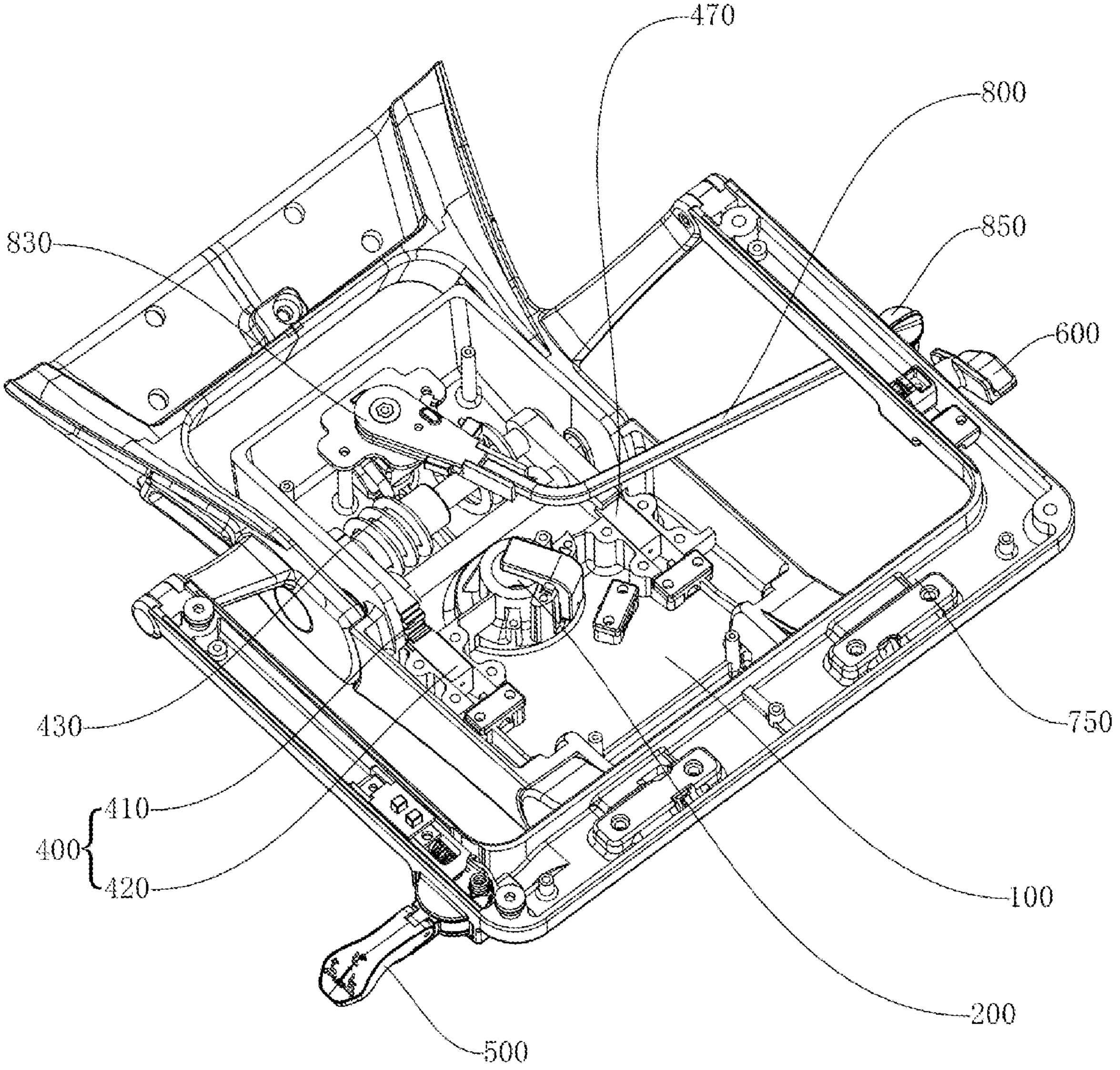
FIG. 4 is a schematic diagram of an inner structure of the base frame assembly as shown in FIG. 1.

In some embodiments, referring to FIG. 4, the lifting connecting structure 200 comprises a pneumatic rod connecting part arranged on the frame body 100, the pneumatic rod connecting part can be connected with a pneumatic rod component to drive the frame body 100 to lift up or down. The pneumatic rod connecting part is connected with a pull rope, one end of the pull rope is connected with a pneumatic rod to control operation thereof, and the other end of the pull rope is connected with the control handle 500. The pneumatic rod connecting part can be connected with a pneumatic rod component outside the base frame. When pressurized, the frame body 100 can be pushed up by an air pressure, or when depressurized, the frame body 100 is allowed to descend, so that the lifting of the frame body 100 can be achieved smoothly. When in motion, the control handle 500 can drive and control the pneumatic rod at the pneumatic rod connecting part through the pull rope, so that a purpose of driving the frame body 100 to lift up and down through the control handle 500 can be successfully achieved.

To be specific, an end of the control handle 500 is hinged to the frame body 100, a connecting part of the pull rope and the control handle 500 is deviated from a rotation center of the control handle 500.

It is foreseeable that the lifting connecting structure 200 can also be composed of other components, such as adjusting a height position of the frame body 100 through a telescopic rod, and fixing the height position of the frame body 100 through structures such as a buckle. The specific implementation can be adjusted according to an actual need, which is not limited hereto.

In some embodiments, referring to FIG. 4, the frame body 100 comprises a hidden rack 750, the control handle 500 is movably connected to the hidden rack 750. The pull rope extends from the pneumatic rod connecting part into the hidden rack 750 and is connected with the control handle 500, and the hidden rack 750 is used for shielding the pull rope to prevent the pull rope from being exposed. The hidden rack 750 can hide and protect the pull rope, so that the pull rope can work more stably, and thus effectively preventing the pull rope from being damaged via an external force. In addition, the pull rope is hidden in the hidden rack 750, which can also effectively improve the whole integrity, and further effectively increase the appearance performance of a chair product.

To be specific, the rotating seat 520 is provided with a through hole 515, and one end of the through hole 515 extends into the hidden rack 750. The frame body 100 is provided with a connecting port 710, the pull rope extends into the hidden rack 750 through the connecting port 710 and is connected with the control handle 500 through the through hole 515, so that the pull rope can be shielded and prevented from being exposed.

It is foreseeable that other components can also be driven by the pull rope, and each pull rope is hidden in the hidden rack 750. The specific implementation can be adjusted according to the actual need, which is not limited hereto.

Figure 2:
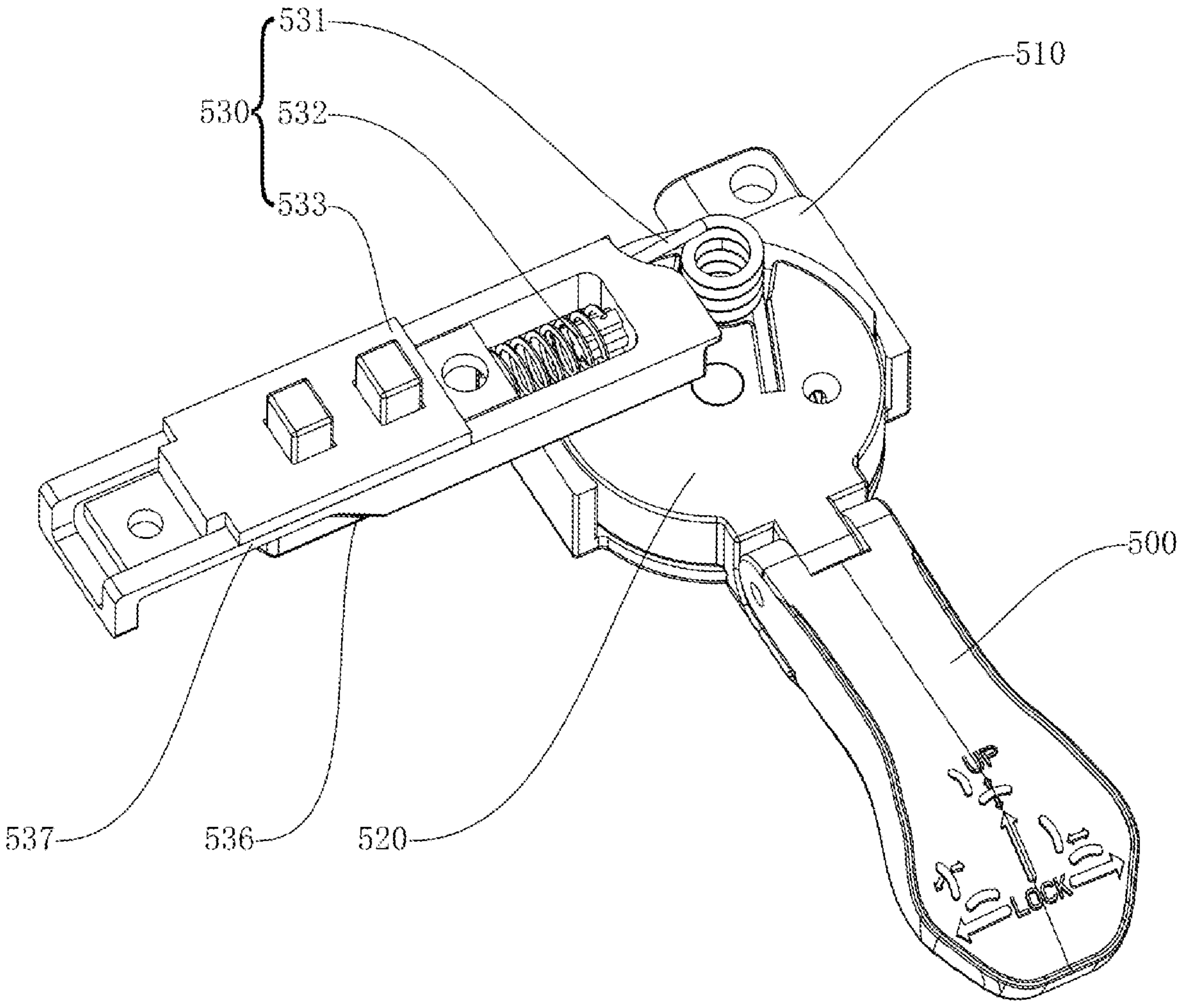
FIG. 2 is a schematic diagram of a control handle of the base frame assembly as shown in FIG. 1.

In some embodiments, referring to FIG. 2, the frame body 100 is provided with a mounting seat 510, a rotating seat 520 is rotatably connected to the mounting seat 510, the control handle 500 is hinged to an end of the rotating seat 520, a rotating shaft of the rotating seat 520 and a rotating shaft of the control handle 500 relative to the rotating seat 520 are noncoplanar. The pull rope passes through the mounting seat 510 and the rotating seat 520 and is connected with the control handle 500. The translation connecting structure 530 is connected with the rotating seat 520. The rotating seat 520 rotates relative to the mounting seat 510, so that the control handle 500 can rotate in a first dimension. When rotating relative to the rotating seat 520, the control handle 500 can rotate in a second dimension and drive the pull rope to move. Because the two rotating shafts in rotating movements are noncoplanar, the control handle 500 can move in two different dimensional directions, to as to be able to drive different components through the movements in different dimensions.

Figure 3:
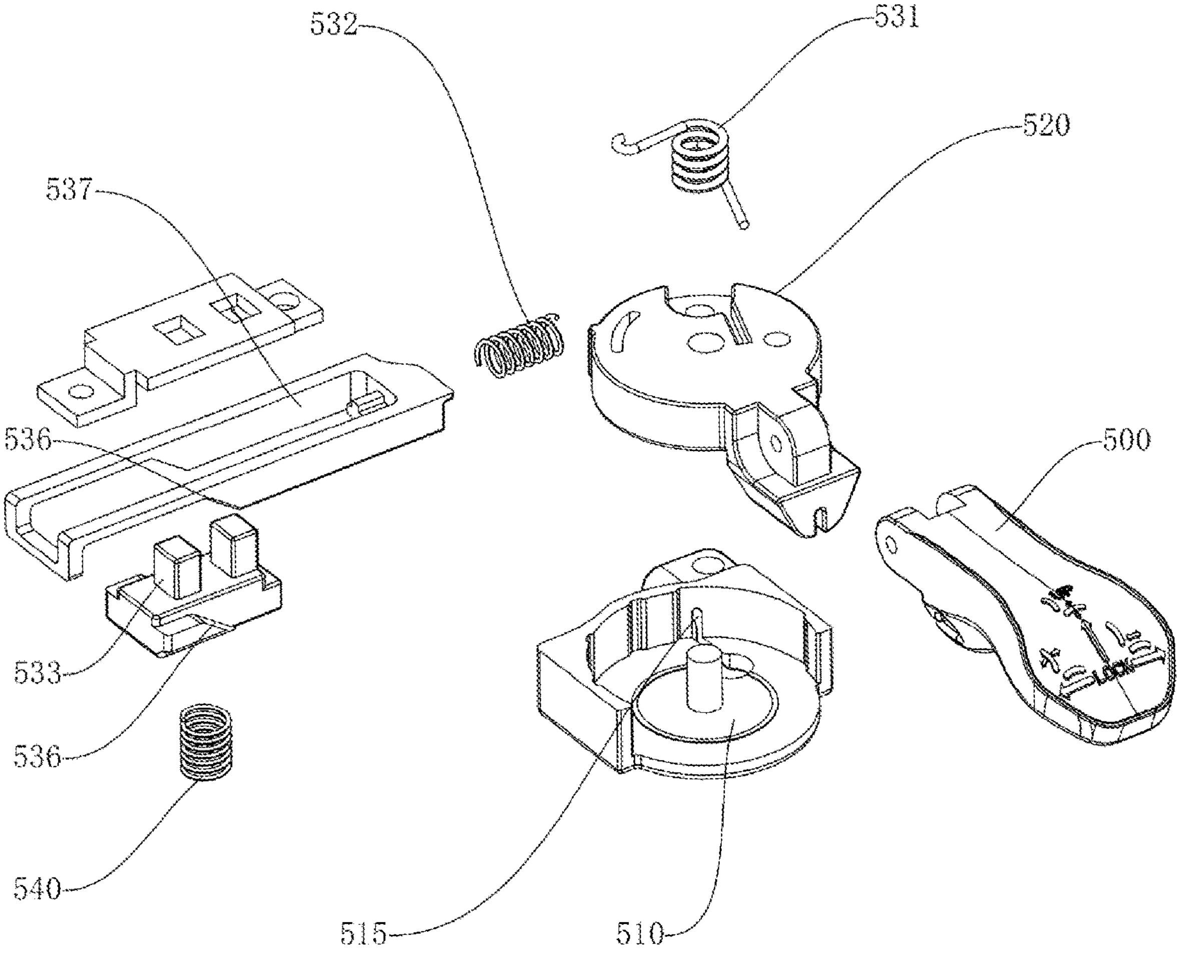
FIG. 3 is a schematic diagram of a dissembling state of the base frame assembly as shown in FIG. 1.

In some embodiments, referring to FIG. 3, the translation connecting structure 530 comprises the rotating seat 520 connected with the control handle 500, the control handle 500 can drive the rotating seat 520 to rotate. The translation connecting structure 530 comprises a cushion connecting part 300 and a sliding block 537, the sliding block 537 is connected with the cushion connecting part 300. A side part of the rotating seat 520 is connected with the sliding block 537 and can drive the sliding block 537 to slide relative to the frame body 100. When the control handle 500 drives the rotating seat 520 to rotate, the sliding block 537 can be driven by the rotating seat 520 to slide relative to the frame body 100, so that the cushion connecting part 300 can be driven by the sliding block 537, and the position adjustment between the frame body 100 and the cushion can be smoothly achieved.

To be specific, the rotating seat 520 is connected with a connection torsion spring 531, and the connection torsion spring 531 is connected with the sliding block 537. The rotating seat 520 can drive the sliding block 537 through the connection torsion spring 531 when rotating, and the connection torsion spring 531 can convert the rotation of the rotating seat 520, so that the sliding block 537 is hard to be influenced by a torque brought by the rotating movement, and the sliding block 537 can slide smoothly.

It is foreseeable that the translation connecting structure 530 can also be composed of other components, for example, the cushion is driven by an eccentric wheel to swing eccentrically relative to the frame body 100, so as to achieve displacement adjusting. The specific implementation can be adjusted according to the actual need, which is not limited hereto.

In some embodiments, referring to FIG. 3, a clamping block 533 is liftably arranged on the frame body 100, a clamping groove 305 is arranged in the cushion connecting part 300, the clamping block 533 can movably extend into the clamping groove 305. A wedge-shaped inclined plane 536 is arranged between the sliding block 537 and the clamping block 533, and when the sliding block 537 slides, the clamping block 533 can be driven to lift up or down through the wedge-shaped inclined plane 536. The sliding block 537 can be connected with the cushion connecting part 300 through the connection between the clamping block 533 and the clamping groove 305. Therefore, the sliding block 537 can smoothly drive the cushion connecting part 300 to move. When sliding significantly, the sliding block 537 will drive the clamping block 533 to lift up and down through the wedge-shaped inclined surface 536, and to enable the clamping block 533 to leave the clamping groove 305, thus disconnect the cushion connecting part 300 with the sliding block 537, thereby avoiding excessive movement of the cushion connecting part 300.

To be specific, a pushing spring 540 is connected to a bottom of the clamping block 533, and the sliding block 537 is connected with a reset spring 532. The reset spring 532 can drive the sliding block 537 to reset after the control handle 500 removes a force applied to the sliding block 537. In this process, the pushing spring 540 will automatically drive the clamping block 533 to reset and clamp in the clamping groove 305, so that the cushion connecting part 300 can automatically reset.

It is foreseeable that a position of the clamping block 533 can also be manually adjusted by the occupant. The specific implementation can be adjusted according to the actual need, which is not limited hereto.

Figure 5:
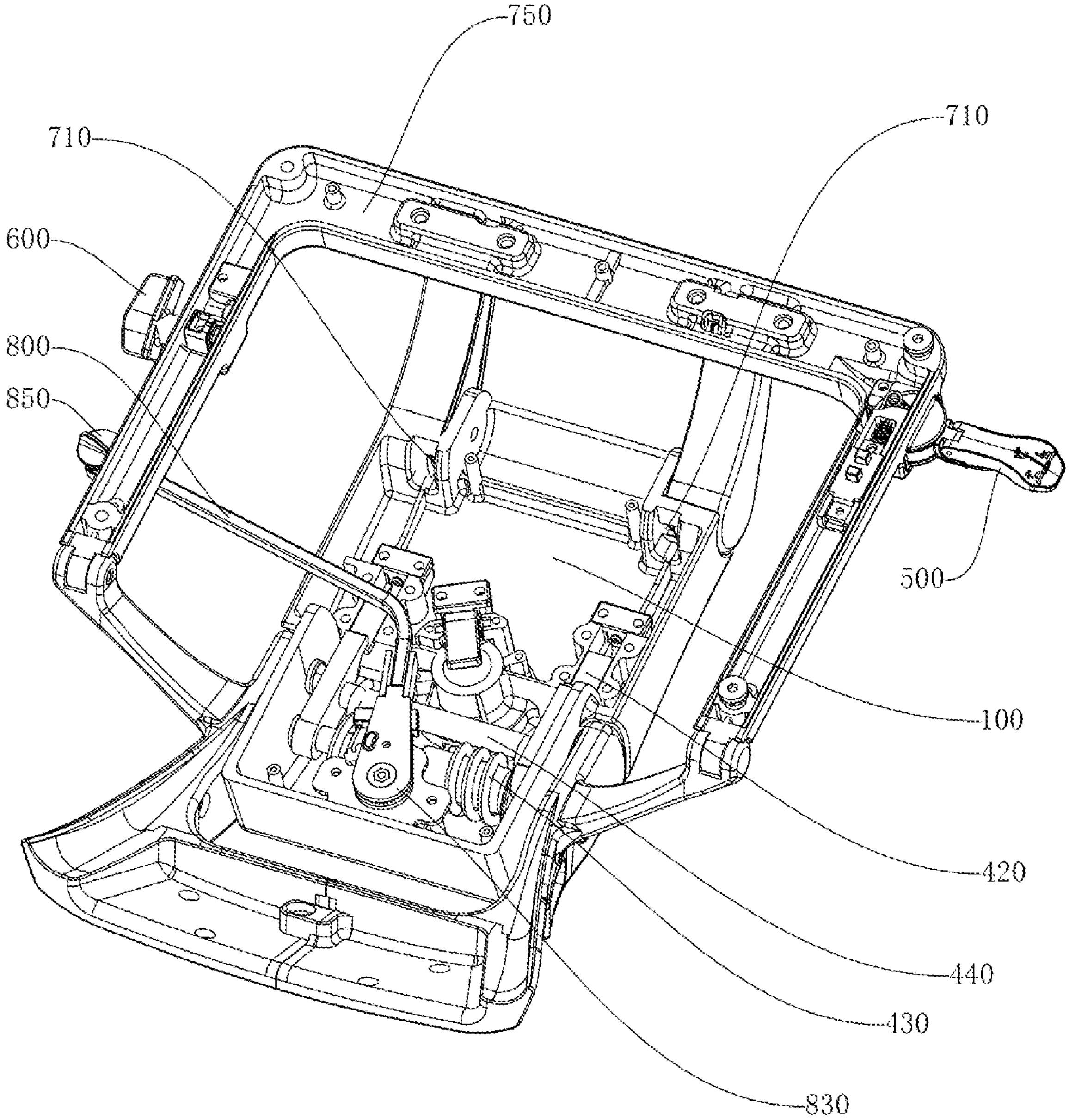
FIG. 5 is a schematic distribution diagram of a hidden rack of the base frame assembly as shown in FIG. 1.

In some embodiments, referring to FIG. 5, the backrest connecting structure 400 comprises a connecting shaft 440, the connecting shaft 440 is used for connecting the backrest and can drive the backrest to rotate relative to the frame body 100. An end of the connecting shaft 440 is connected with a toothed part 410, an engaging block 420 is slidably arranged in the frame body 100, the engaging block 420 is able to be engaged with the toothed part 410 to prevent the toothed part from rotating, and the engaging block 420 is connected with a pull rope and is connected with the control handle 500 through the pull rope. After the control handle 500 drives the engaging block 420 away from the toothed part 410 through the pull rope, when the occupant exerts a force on the backrest, the backrest can be driven to rotate relative to the connecting shaft 440, thus achieving position adjustment on the backrest. After the adjustment of the backrest is finished, the occupant can drive the engaging block 420 to reset by the control handle 500, so that the engaging block 420 can be engaged with the toothed part 410, and then the connecting shaft 440 can be fixed. Therefore, the fixing of the backrest can be achieved smoothly, ensuring a stable supporting by the backrest.

To be specific, the frame body 100 is provided with a control knob 600, and the control knob 600 is connected with a locking latch 470 through a pull rope. The connecting shaft 440 is provided with a locking member 460, the locking member 460 is provided with a blocking step, the frame body 100 is internally provided with a reset torsion spring connected with the locking latch 470 and used for driving the locking latch 470 to move towards the blocking step, the locking latch 470 is used for abutting against and blocking the rotation of the blocking step. The control knob 600 can drive the locking latch 470 to move away from the blocking step by the pull rope. When the control knob 600 does not exert a force on the locking latch 470, the reset torsion spring will exert a force on the locking latch 470, so that the locking latch 470 moves towards and abuts against the blocking step. After that, because the blocking step and the locking latch 470 are mutually blocked, the connecting shaft 440 will be blocked at the blocking step to be unable to move continuously, so as to directly and effectively lock a rotating position of the backrest. After the control knob 600 exerts a force on the locking latch 470 through the pull rope, the locking latch 470 can be driven away from the blocking step, so that the connecting shaft 440 can continue to rotate, and thus smoothly adjusting the backrest.

In some embodiments, referring to FIG. 5, a driving torsion spring 430 is arranged in the frame body 100, the driving torsion spring 430 is used for connecting to the backrest and driving the backrest to rotate relative to the frame body 100. A handle 800 and an elastic force adjusting structure 830 are arranged in the frame body 100, and the handle 800 is rotatable to adjust an elastic force applied to the backrest by the driving torsion spring 430 through the elastic force adjusting structure 830. The driving torsion spring 430 can not only drive the backrest to move and facilitate the position adjustment of the backrest, but also increase a supporting elastic force of the backrest when the backrest supports a back of the occupant, thus providing more excellent support by the backrest. When the occupant wants to adjust the supporting elastic force of the backrest, the elastic force applied to the driving torsion spring 430 can be adjusted through the handle 800 and the elastic force adjusting structure 830, so that the backrest can be smoothly adjusted to a target state.

Figure 6:
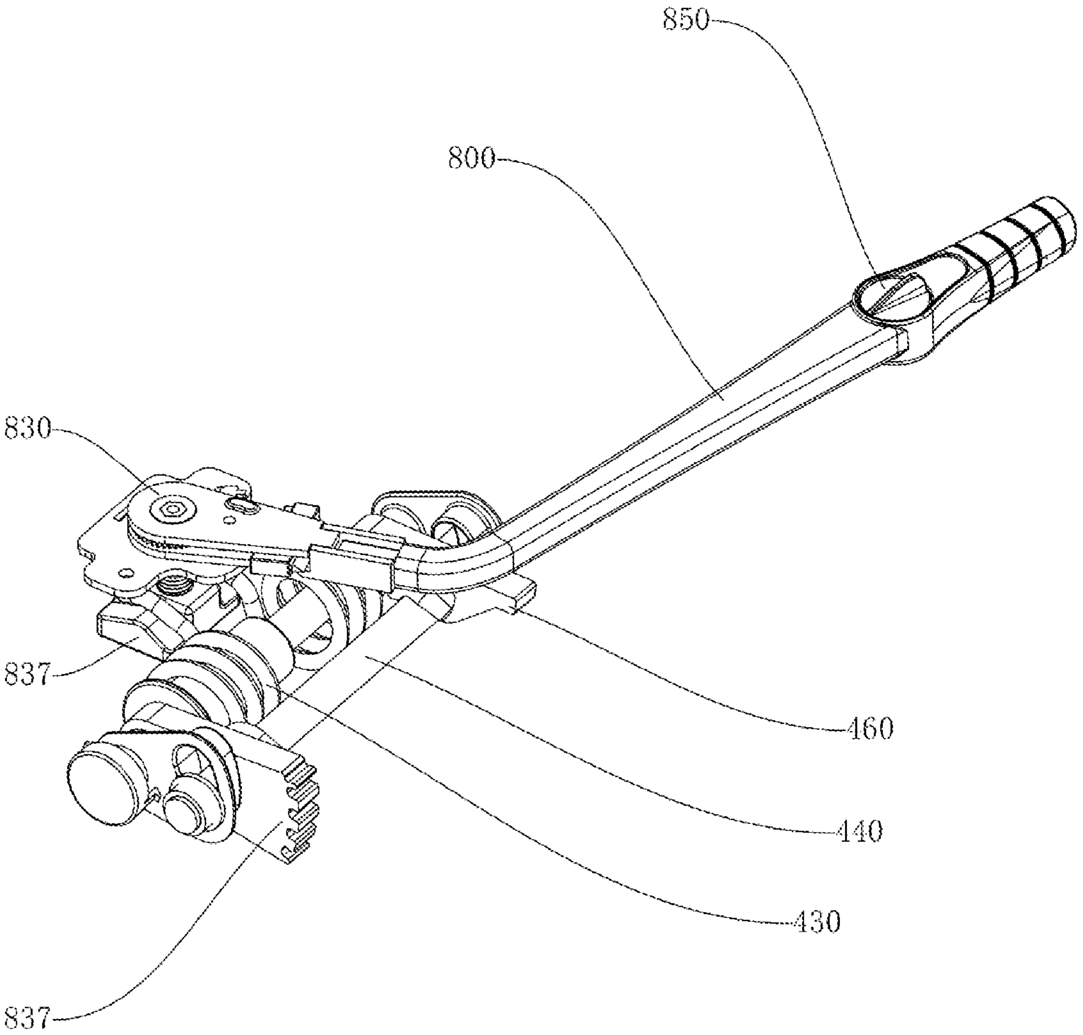
FIG. 6 is a schematic connection diagram of a backrest connecting structure of the base frame assembly as shown in FIG. 1.
Figure 7:
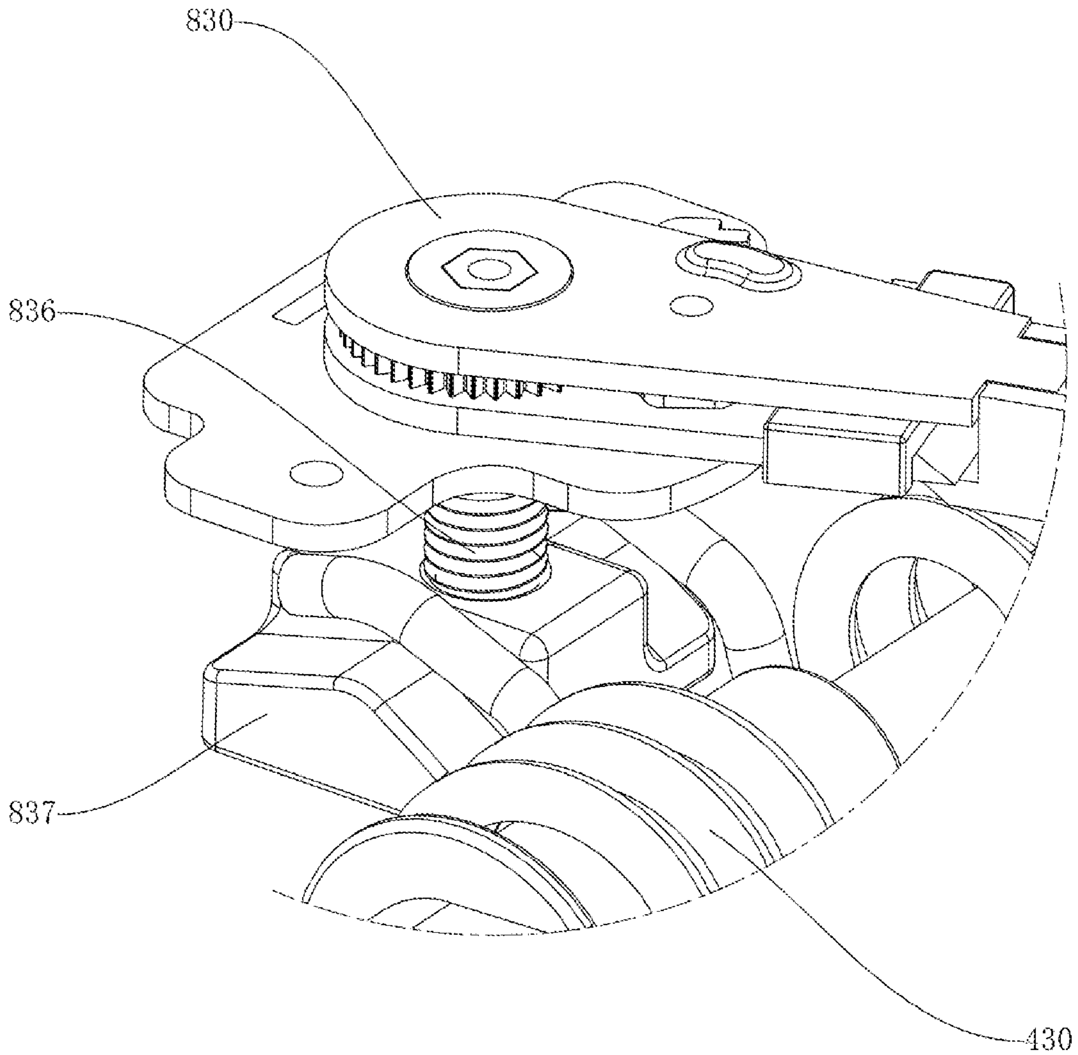
FIG. 7 is a schematic connection diagram of an elastic force adjusting structure of the base frame assembly as shown in FIG. 1.
Figure 8:
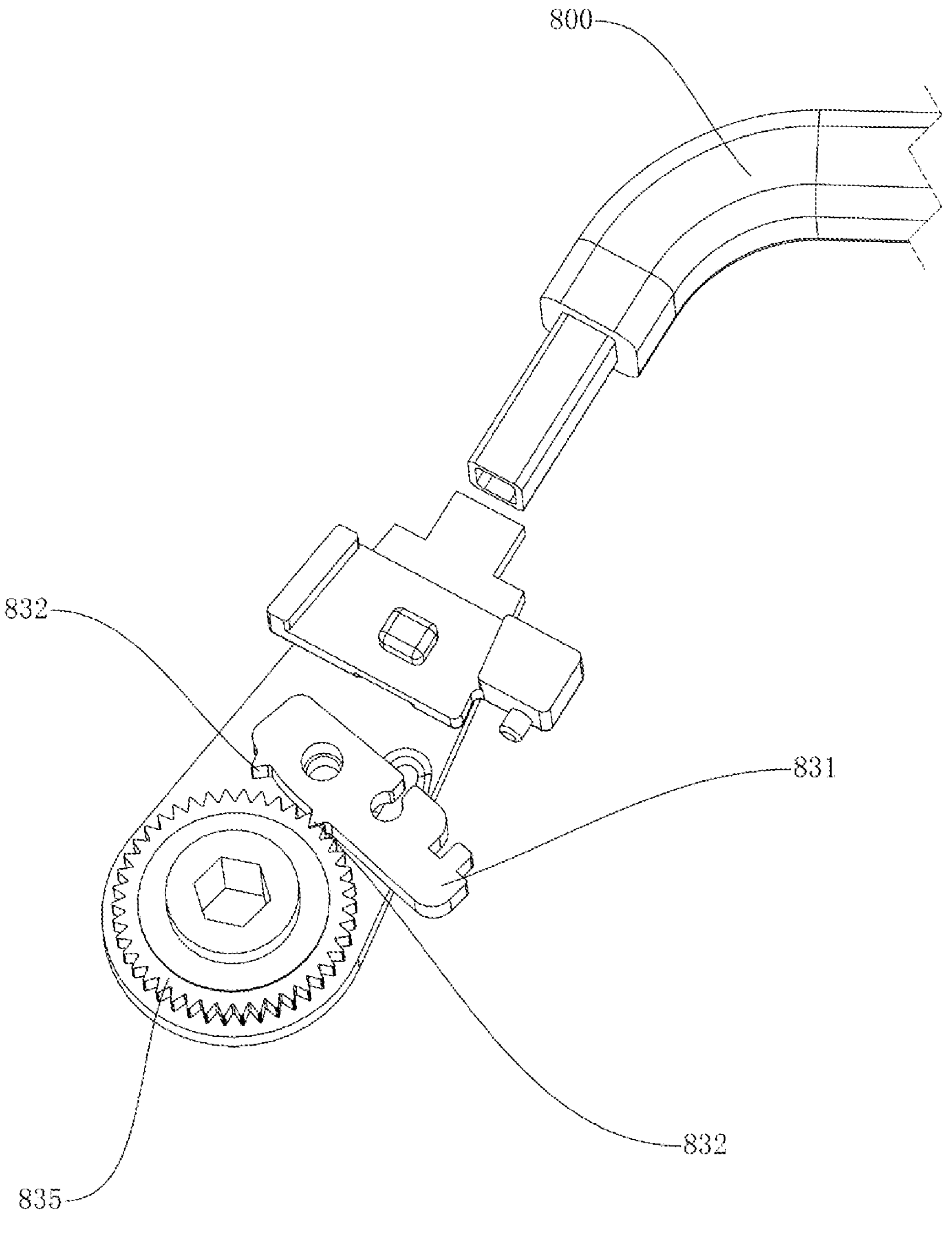
FIG. 8 is a schematic connection diagram of a handle of the base frame assembly as shown in FIG. 1.

In some embodiments, referring to FIG. 6, FIG. 7 and FIG. 8, a screw 836 is provided around which the handle 800 is rotatable, the screw 836 is connected with a supporting base 837, and an end of the driving torsion spring 430 is engaged with the supporting base 837 and can be driven to move by the supporting base. The frame body 100 is provided with a gear 835, one end of the handle 800 is connected with the gear 835, the other end of the handle 800 is provided with a rotary knob 850, A pull rope and a connecting member 831, and the connecting member 831 is provided with clamping teeth 832. The rotary knob 850 is connected with the connecting member 831 through the pull rope, and the connecting member 831 is rotatable relative to the gear 835, so that the clamping teeth 832 are engaged with the gear 835. When rotating, the handle 800 will drive the screw 836 to rotate together. When rotating, the screw 836 will drive the supporting base 837 to lift up and down, thus changing a position where the supporting base 837 supports an end of the driving torsion spring 430. One end of the driving torsion spring 430 is connected with the backrest, and the other end of the driving torsion spring 430 is engaged with the supporting base 837. Therefore, after the supporting base 837 changes the position, a distance between two ends of the driving torsion spring 430 changes, which will change the elastic force of the driving torsion spring 430. When the rotary knob 850 drives the connecting member 831 to move, it can fix or release the relative position between the handle 800 and the gear 835 through the clamping teeth 832 on the connecting member 831, thus allowing for locking or unlocking rotation of the handle.

Further, the connecting member 831 is provided with two clamping teeth 832, and the two camping teeth 832 are located on both sides of the gear 835 respectively.

In a second aspect, an embodiment of the disclosure provides a chair, comprising the above base frame assembly. The frame body 100 is liftable relative to a ground and other parts by the lifting connecting structure 200, movable relative to a cushion by the translation connecting structure 530, and able to drive a backrest to rotate by the backrest connecting structure 400, so that each state of the chair can be smoothly adjusted to a target state for an occupant. When adjusting each state of the chair, the occupant only needs to drive the control handle 500 to move or rotate in a corresponding direction, so as to achieve adjustment to the corresponding state. As the adjustment to various states can be achieved by the control handle 500, the time and effort required by the occupant to find and drive the adjustment parts respectively when adjusting a plurality of chair states can be effectively reduced, thus effectively achieving convenient and quick use.

The technical features of the above embodiments can be combined arbitrarily. In order to make the description concise, not all possible combinations of the technical features in the above embodiments are described. However, as long as no contradiction exits between the combinations of these technical features, the combinations should be considered within the scope recorded in this specification.

The embodiments of the disclosure have been described in detail with reference to the accompanying drawings, but the disclosure is not limited to the above embodiments, and various changes may be made within the knowledge of those of ordinary skills in the art without departing from the purpose of the disclosure.

What is claimed is:

1. A base frame assembly, comprising:

a frame body;

a lifting connecting structure arranged on the frame body, wherein the lifting connecting structure is used for driving the frame body to lift up or down;

a translation connecting structure arranged on the frame body, wherein the translation connecting structure is used for driving the frame body to move back and forth and/or move left and right;

a backrest connecting structure arranged on the frame body and used for connecting with a backrest, wherein the backrest connecting structure is used for driving the backrest to rotate relative to the frame body; and a control handle movably arranged on the frame body, wherein the lifting connecting structure, the translation connecting structure and the backrest connecting structure are all connected with the control handle; and the control handle is movable and/or rotatable in at least three different directions, to respectively drive the lifting connecting structure, the translation connecting structure and the backrest connecting structure through different motion trajectories;

the translation connecting structure comprises a rotating seat connected with the control handle, the control handle is able to drive the rotating seat to rotate; the translation connecting structure comprises a cushion connecting part and a sliding block, the sliding block is connected with the cushion connecting part; and a side part of the rotating seat is connected with the sliding block and is able to drive the sliding block to slide relative to the frame body;

a clamping block is liftably arranged on the frame body, a clamping groove is arranged in the cushion connecting part, the clamping block is able to extend into the clamping groove; a wedge-shaped inclined plane is arranged between the sliding block and the clamping block, and when the sliding block slides, the clamping block is driven to lift up or down through the wedge-shaped inclined plane.

2. The base frame assembly according to claim 1, wherein the lifting connecting structure comprises a pneumatic rod connecting part arranged on the frame body, the pneumatic rod connecting part is connected with a pneumatic rod component to drive the frame body to lift up or down; the pneumatic rod connecting part is connected with a pull rope, one end of the pull rope is connected with a pneumatic rod to control operation of the pneumatic rod, and the other end of the pull rope is connected with the control handle.

3. The base frame assembly according to claim 2, wherein the frame body comprises a hidden rack, the control handle is movably connected to the hidden rack; the pull rope extends from the pneumatic rod connecting part into the hidden rack and is connected with the control handle, and the hidden rack is used for shielding the pull rope to prevent the pull rope from being exposed.

4. The base frame assembly according to claim 3, wherein the frame body is provided with a mounting seat, a rotating seat is rotatably connected to the mounting seat, the control handle is hinged to an end of the rotating seat, and a rotating shaft of the rotating seat and a rotating shaft of the control handle relative to the rotating seat are noncoplanar; and the pull rope passes through the mounting seat and the rotating seat and is connected with the control handle; and the translation connecting structure is connected with the rotating seat.

5. The base frame assembly according to claim 1, wherein the backrest connecting structure comprises a connecting shaft, the connecting shaft is used for connecting the backrest and driving the backrest to rotate relative to the frame body; an end of the connecting shaft is connected with a toothed part, an engaging block is slidably arranged in the frame body, the engaging block is able to be engaged with the toothed part to prevent the toothed part from rotating, and the engaging block is connected with a pull rope and is connected with the control handle through the pull rope.

6. The base frame assembly according to claim 5, wherein a driving torsion spring is arranged in the frame body, the driving torsion spring is used for connecting to the backrest and driving the backrest to rotate relative to the frame body; a handle and an elastic force adjusting structure are arranged in the frame body, and the handle is rotatable to adjust an elastic force applied to the backrest by the driving torsion spring through the elastic force adjusting structure.

7. The base frame assembly according to claim 6, wherein a screw is provided around which the handle is rotatable, the screw is connected with a supporting base, and an end of the driving torsion spring is engaged with the supporting base and is driven to move by the supporting base; and the frame body is provided with a gear, one end of the handle is connected with the gear, the other end of the handle is provided with a rotary knob, a pull rope and a connecting member, and the connecting member is provided with clamping teeth, the rotary knob is connected with the connecting member through the pull rope, and the connecting member is rotatable relative to the gear, so that the clamping teeth are engaged with the gear.

8. A chair, comprising the base frame assembly according to claim 1.

* * * * *